United States Patent
Tanaka

(10) Patent No.: US 10,794,994 B2
(45) Date of Patent: Oct. 6, 2020

(54) RADAR CONTROL DEVICE AND METHOD OF CONTROLLING TRANSMISSION POWER OF RADAR

(71) Applicant: FURUNO ELECTRIC CO., LTD., Nishinomiya, Hyogo (JP)

(72) Inventor: Keisuke Tanaka, Hyogo (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 312 days.

(21) Appl. No.: 15/926,933

(22) Filed: Mar. 20, 2018

(65) Prior Publication Data

US 2018/0275247 A1    Sep. 27, 2018

(30) Foreign Application Priority Data

Mar. 22, 2017  (JP) ................................ 2017-055252

(51) Int. Cl.
| | | |
|---|---|---|
| *G01S 7/40* | (2006.01) | |
| *G01S 13/06* | (2006.01) | |
| *G01S 13/10* | (2006.01) | |
| *G01S 7/282* | (2006.01) | |
| *G01S 13/22* | (2006.01) | |

(52) U.S. Cl.
CPC ............ *G01S 7/4008* (2013.01); *G01S 7/282* (2013.01); *G01S 13/06* (2013.01); *G01S 13/103* (2013.01); *G01S 13/106* (2013.01); *G01S 13/22* (2013.01); *G01S 2007/4013* (2013.01)

(58) Field of Classification Search
CPC .... G01S 7/52003; G01S 7/4008; G01S 7/282; G01S 13/06; G01S 13/103; G01S 13/106; G01S 13/22; G01S 2007/4013; G01S 15/584; G01S 15/8986
USPC ............................................... 342/82, 91, 92
See application file for complete search history.

(56) References Cited

U.S. PATENT DOCUMENTS

| | | | | |
|---|---|---|---|---|
| 5,128,683 A | * | 7/1992 | Freedman | ................ G01S 7/032 342/158 |
| 2007/0252751 A1 | * | 11/2007 | Nakahama | ............ G01S 13/106 342/94 |

(Continued)

FOREIGN PATENT DOCUMENTS

JP     2010-145339 A     7/2010

*Primary Examiner* — Erin F Heard
*Assistant Examiner* — Michael W Justice
(74) *Attorney, Agent, or Firm* — Studebaker & Brackett PC

(57) ABSTRACT

A radar control device is provided, which includes a signal generating module configured to generate a transmission pattern signal comprised of at least one kind of pulse signal that is set among pulse signals including first and second pulse signals, a transmitter configured to externally transmit the transmission pattern signal via a radar antenna, a detector configured to detect transmission power of each pulse signal included in the transmission pattern signal, and a processing circuit configured to control, when the transmission pattern signal includes the second pulse signal, the transmission power of the transmission pattern signal by using a control value calculated based on the transmission power of the second pulse signal, and control, when the transmission pattern signal consists of the first signal, the transmission power of the first pulse signal by using a control value previously used for controlling the transmission power of the second pulse signal.

13 Claims, 6 Drawing Sheets

(56) References Cited

U.S. PATENT DOCUMENTS

2015/0160067 A1\* 6/2015 Sai .................. G01S 7/285
                                                          342/21
2016/0266240 A1\* 9/2016 Hughes ............ G01F 25/0061
2016/0299222 A1\* 10/2016 Watanabe ........... G01S 7/2923

\* cited by examiner

NON-MODULATED PULSE SIGNAL
(PULSE WIDTH: SHORT)

NON-MODULATED PULSE SIGNAL
(PULSE WIDTH: MEDIUM)

NON-MODULATED PULSE SIGNAL
(PULSE WIDTH: LONG)

MODULATED PULSE SIGNAL
(PULSE WIDTH: SHORT)

MODULATED PULSE SIGNAL
(PULSE WIDTH: MEDIUM)

MODULATED PULSE SIGNAL
(PULSE WIDTH: LONG)

RADAR CONTROL DEVICE AND METHOD OF CONTROLLING TRANSMISSION POWER OF RADAR

CROSS-REFERENCE TO RELATED APPLICATION(S)

This application claims priority under 35 U.S.C. § 119 to Japanese Patent Application No. 2017-055252, which was filed on Mar. 22, 2017, the entire disclosure of which is hereby incorporated by reference.

TECHNICAL FIELD

The present disclosure generally relates to a radar control device which transmits pulse signals having different pulse widths.

BACKGROUND

Radar apparatuses detect target object(s) located therearound by causing an antenna to transmit pulse signals and receive reflections of the pulse signals from the target object(s). The radar apparatuses also switch pulse widths of the pulse signals according to a display range (distance range) etc.

JP2010-145339A discloses a radar apparatus having an electric field intensity map showing an electric field intensity at each position. This radar apparatus determines whether a reception failure occurs in other radio wave reception facility(s) based on the electric field intensity map and, if the reception failure is determined as occurred, adjusts transmission power of a pulse signal toward the radio wave reception facility(s) with the reception failure to be lower.

Although JP2010-145339A discloses the adjustment of the transmission power of the pulse signal, it does not disclose processing for accurately bringing the transmission power of the pulse signal close to the target value.

SUMMARY

The purpose of the present disclosure mainly relates to providing a radar control device for transmitting pulse signals having different pulse widths, which has a configuration in which transmission powers of the pulse signals are accurately brought closer to a target value.

According to a first aspect of the present disclosure, a radar control device with the following configuration is provided. That is, the radar control device may include a signal generating module, a transmitter, a detector, and a processing circuit. The signal generating module may generate a transmission pattern signal comprised of at least one kind of pulse signal that is set among pulse signals including a first pulse signal and a second pulse signal having a longer pulse width than the first pulse signal. The transmitter may externally transmit the generated transmission pattern signal via a radar antenna. The detector may detect transmission power of each pulse signal included in the transmission pattern signal transmitted by the transmitter. The processing circuit may control, when the transmission pattern signal includes the second pulse signal, the transmission power of the transmission pattern signal by using a control value calculated based on the transmission power of the second pulse signal detected by the detector, and control, when the transmission pattern signal consists of the first pulse signal, the transmission power of the first pulse signal by using a control value previously used for controlling the transmission power of the second pulse signal.

According to a second aspect of the present disclosure, a following method of controlling transmission power of a radar is provided. That is, the method may include generating a transmission pattern signal comprised of at least one kind of pulse signal set among pulse signals including a first pulse signal and a second pulse signal having a longer pulse width than the first pulse signal, externally transmitting the transmission pattern signal via a radar antenna, detecting transmission power of each pulse signal included in the transmission pattern signal, controlling, when the transmission pattern signal includes the second pulse signal, the transmission power of the transmission pattern signal by using a control value calculated based on the detected transmission power of the second pulse signal, and controlling, when the transmission pattern signal consists of the first pulse signal, the transmission power of the first pulse signal by using a control value previously used for controlling the transmission power of the second pulse signal.

Thus, when only the first pulse signal is transmitted, even when the transmission power of the first pulse signal cannot accurately be detected, by using the control value previously used for the second pulse signal, the transmission power of the first pulse signal may be brought closer to a target value.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
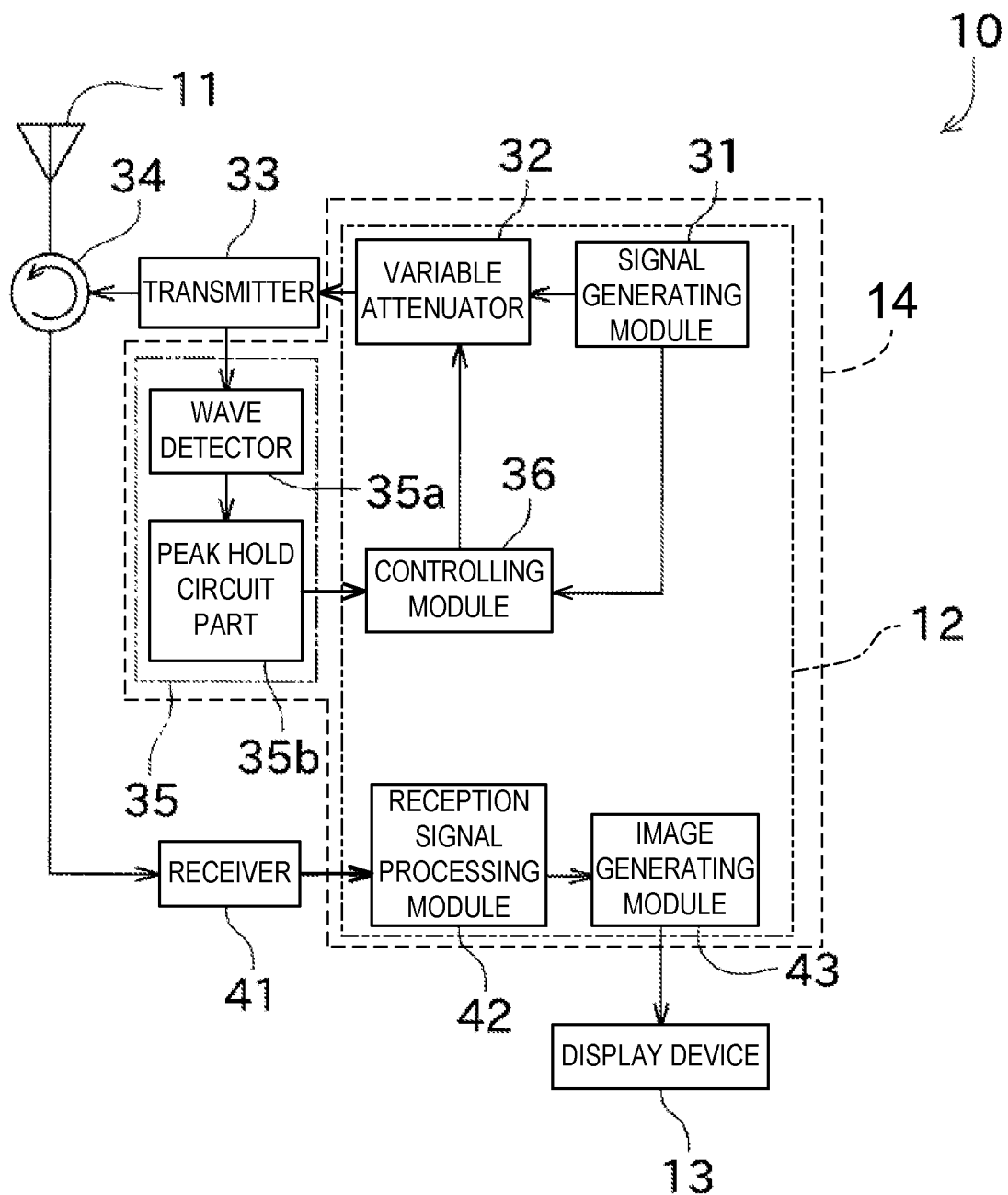
FIG. 1 is a block diagram of a radar apparatus including a radar control device according to one embodiment of the present disclosure.

One embodiment of the present disclosure is described with reference to the accompanying drawings. In the following embodiment, an example is illustrated in which this disclosure is applied to a ship. However, the present disclosure may be applied to any kinds of vehicles having a rudder or a similar steering device, such as other watercrafts including boats, vessels, and submarines, as well as land vehicles, airplanes and spaceships. FIG. 1 is a block diagram of a radar apparatus including a radar control device according to this embodiment of the present disclosure.

A radar apparatus 10 of this embodiment may be a radar apparatus for a ship. The radar apparatus 10 may externally transmit a pulse-shaped transmission signal (pulse signal) generated by a semiconductor element. The radar apparatus 10 may also receive a reflection of the pulse signal, analyze this reflection by performing pulse compression etc. thereon, and thus detect a position etc. of a target object. Note that the transmission signal may alternatively be generated by, for example, a magnetron instead of a semiconductor element.

As illustrated in FIG. 1, the radar apparatus 10 may include a radar antenna 11, a radar control device 12, a display device 13, and processing circuitry 14.

The radar antenna 11 may externally transmit the pulse signal and receive the reflection of the pulse signal from a target object located therearound. Hereinafter, the reflection received by the radar antenna 11 may be referred to as the reception signal. The radar antenna 11 may repeat the transmission and reception of the radio wave while rotating at a given cycle in a horizontal plane. The radar apparatus 10 may thus detect the target object around a ship on which the radar apparatus 10 is mounted (hereinafter, simply referred to as "the ship").

Note that a radar apparatus which does not rotate its radar antenna may alternatively be used. For example, a radar apparatus having antenna elements in all circumferential directions, a radar apparatus which only detects a specific direction, such as forward, etc., are not required to rotate a radar antenna. Additionally, the radar apparatus 10 may transmit and receive the radio wave with one radar antenna, or may have a transmission radar antenna and a reception radar antenna.

The radar control device 12 may execute a control (transmission control, reception control, analysis control, etc.) regarding the radar apparatus 10. Various components constituting the radar control device 12 may be disposed in a housing of the radar antenna 11 (on the antenna side) or in a housing of the display device 13 (on an instruction unit side). Note that at least one or some of the components constituting the radar control device 12 may alternatively be disposed in a separate housing from the radar antenna 11 and the display device 13.

The radar control device 12 may include a signal generating module 31, a variable attenuator 32, a transmitter 33, a transmission-reception switch 34, a detector 35, and a controlling module (processing circuit) 36 as components regarding the transmission control of the transmission signal.

Figure 2:
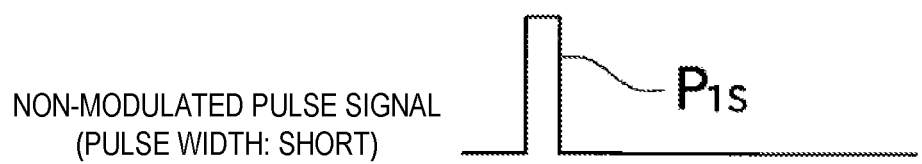
FIG. 2 is a diagram illustrating kinds of pulse signals which the radar apparatus transmits.
Figure 2:
Figure 2:
Figure 2:
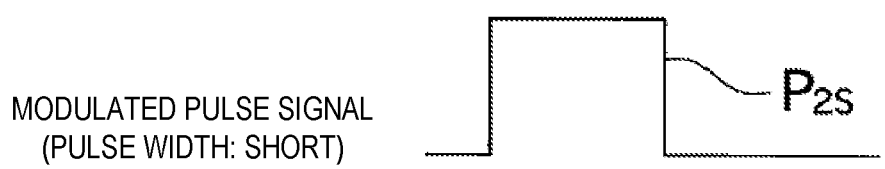
Figure 2:
Figure 2:
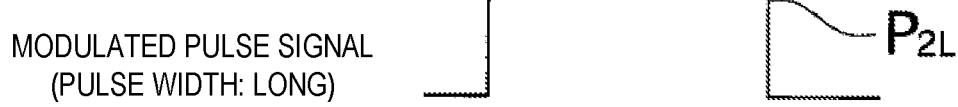

The signal generating module 31 may generate a pulse signal having a given waveform by specifying a pulse width, a modulation mode (a frequency modulation width and a frequency change mode) etc. FIG. 2 illustrates pulse signals which the signal generating module 31 transmits. As illustrated in FIG. 2, the signal generating module 31 may generate non-modulated pulse signals of a pulse $P_{1S}$ having a shortest pulse width, a pulse $P_{1M}$ having a second-shortest pulse width, and a pulse $P_{1L}$ having a longest pulse width. Further, the signal generating module 31 may generate modulated pulse signals of a pulse $P_{2S}$ having a shortest pulse width, the $P_{2M}$ having a second-shortest pulse width, and the pulse width $P_{2L}$ having a longest pulse width.

The relationship among the pulse widths of the pulse signals may be expressed as an inequality of $P_{1S}<P_{1M}<P_{1L}<<P_{2S}<P_{2M}<P_{2L}$. As indicated by this inequality, the pulse widths of the non-modulated pulse signals may be significantly shorter than those of the modulated pulse signals. For example, the pulse widths of the non-modulated pulse signals may be about 50 nanoseconds to 1 microsecond, and the pulse widths of the modulated pulse signals may be about 5 to 20 microseconds.

As described above, the signal generating module 31 of this embodiment may generate the plurality of kinds of non-modulated pulses having different pulse widths and the plurality of kinds of modulated pulses having different pulse widths. Note that, it may be sufficient as long as the signal generating module 31 generates at least two kinds of pulse signals having different pulse widths.

Figure 3:
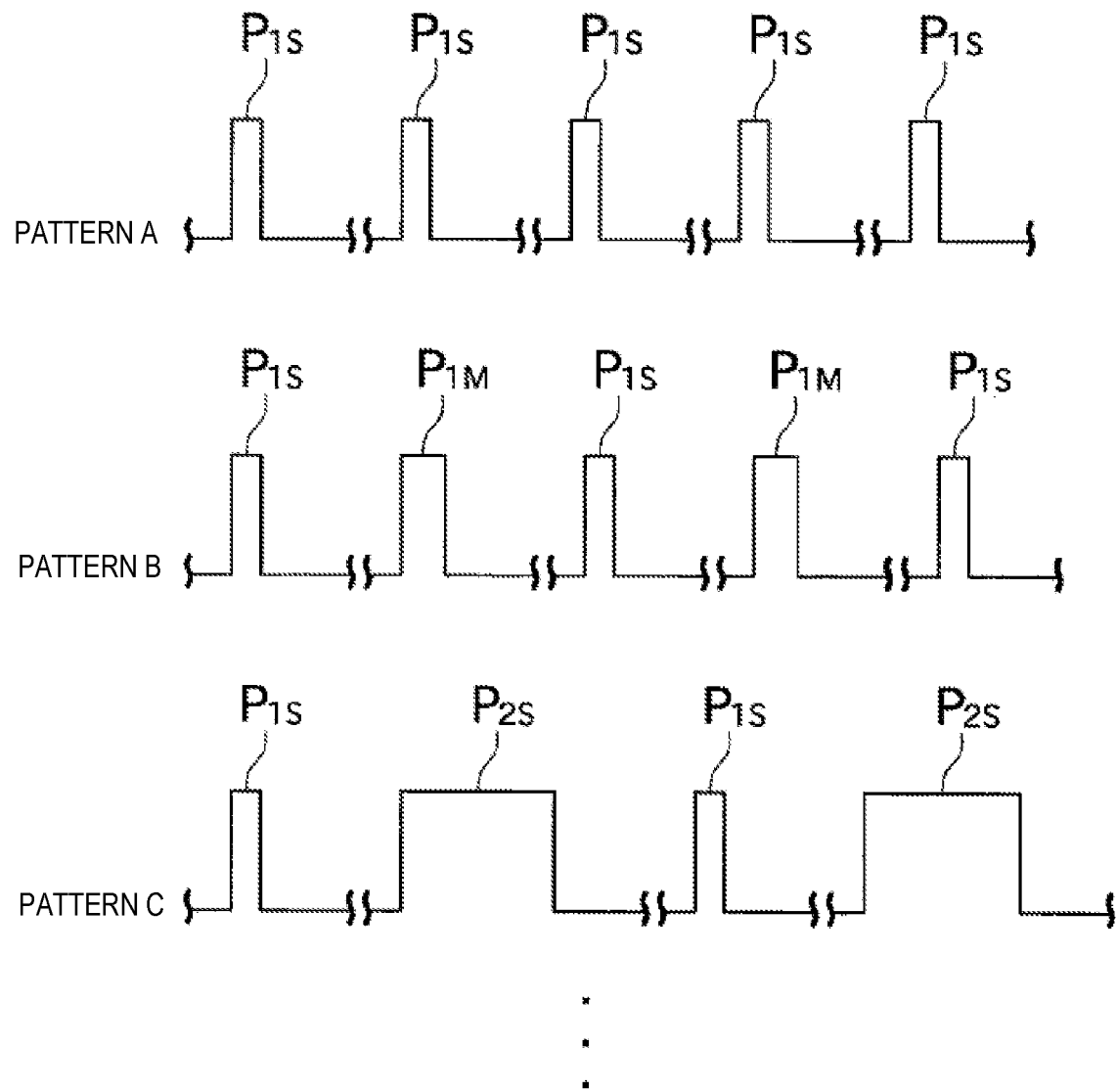
FIG. 3 is a diagram illustrating patterns of the pulse signals transmitted by the radar apparatus.

Further, the signal generating module 31 may generate one or more pulse signals following a transmission pattern obtained by combining one or more kinds of the pulse signals described above. Hereinafter, the one or more pulse signals generated following the transmission pattern are referred to as "transmission pattern signal." The radar apparatus 10 of this embodiment may alternate a transmission period and a reception period, and one transmission pattern signal may be transmitted for one transmission period. FIG. 3 illustrates transmission patterns of the pulse signals. The transmission pattern signal of pattern A may consist of the pulse $P_{1S}$. Generally, a pulse signal having a short pulse width is used for detecting a short distance. Since the pulse $P_{1S}$ has the shortest pulse width, pattern A may be used when performing a detection in the closest vicinity of the ship (when a narrowest display range of a radar image is set). The transmission pattern signal of pattern B may be comprised of the pulse $P_{1S}$ and the pulse $P_{1M}$. The transmission pattern signal of pattern C may be comprised of the pulse $P_{1S}$ and the pulse $P_{2S}$. When transmitting a pulse signal having a long pulse width, since reflection from the vicinity of the ship reaches the ship before the transmission of the pulse signal completes, the close distance range cannot be detected. Therefore, the pulse signals having different pulse widths may alternately be transmitted as in pattern B and pattern C. Note that the transmission patterns illustrated in FIG. 3 are merely examples and the radar apparatus 10 may transmit the pulse signals in a different transmission pattern.

The pulse signals constituting the transmission pattern signal generated by the signal generating module 31 may be inputted to the variable attenuator 32. The variable attenuator 32 may adjust transmission power of each inputted pulse signal. The variable attenuator 32 may change the adjustment amount of transmission power according to a control value inputted from the controlling module 36. The pulse signal adjusted in transmission power by the variable attenuator 32 may be transmitted by the transmitter 33 to the transmission-reception switch 34.

The transmission-reception switch 34 may switch the transmission and reception of the electromagnetic wave therebetween. For example, when externally transmitting the pulse signal, the transmission-reception switch 34 may output the transmission signal outputted from the transmitter 33 to the radar antenna 11. Thus, the pulse signal may be externally transmitted. On the other hand, when externally receiving the reflection, the transmission-reception switch 34 may output the reflection (reception signal) received by the radar antenna 11 to a receiver 41 described later.

Figure 4:
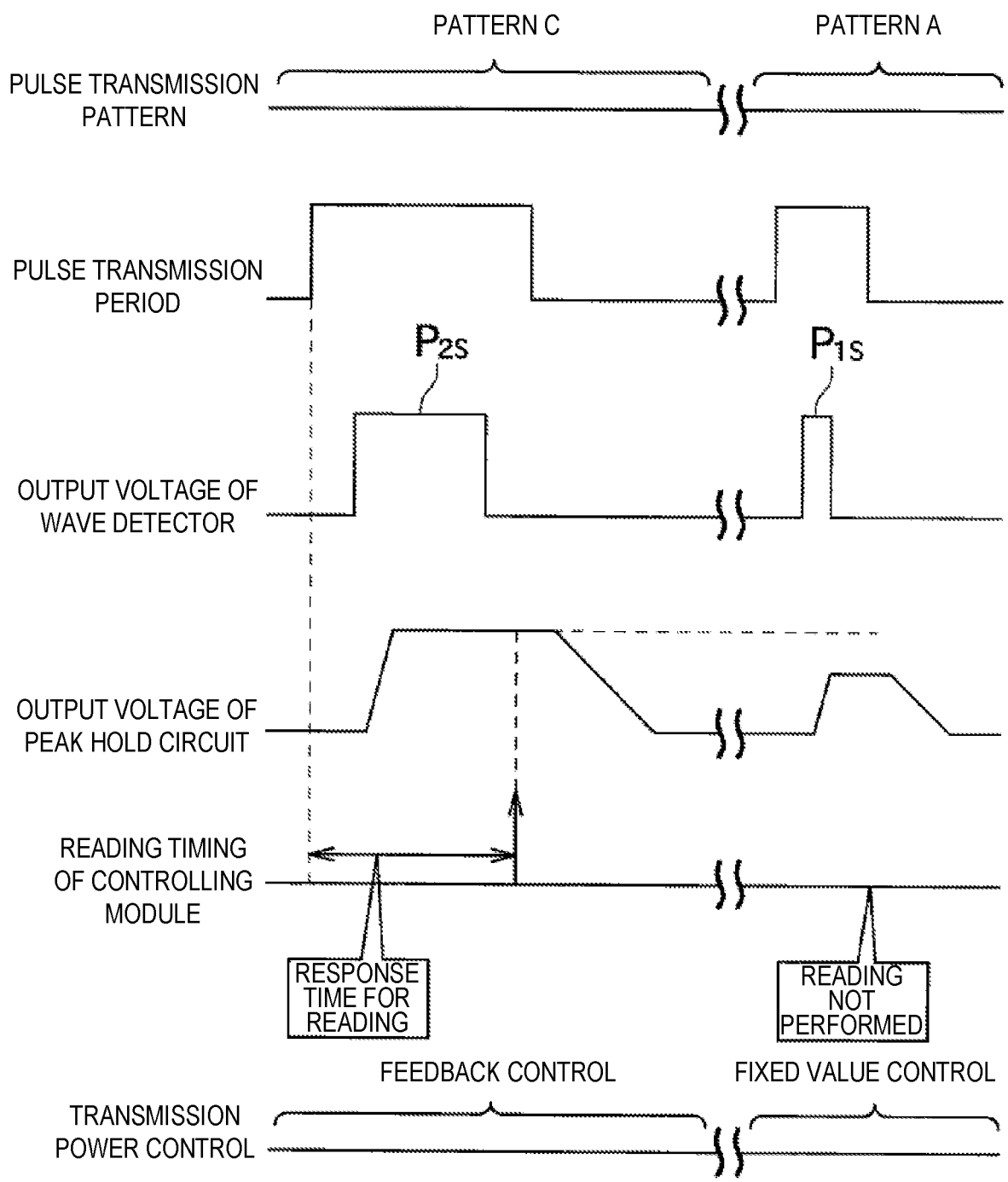
FIG. 4 shows timing charts illustrating processing performed by a detector and a controlling module in pattern C and pattern A.

The detector 35 may detect the transmission power of the pulse signal transmitted by the transmitter 33. FIG. 4 shows timing charts of processing performed by the detector 35. The detector 35 may include a wave detector 35a and a peak hold circuit part 35b. The pulse signal transmitted by the transmitter 33 may also be inputted to the wave detector 35a. As illustrated in FIG. 4, the wave detector 35a may output a voltage corresponding to (e.g., proportional to) the transmission power of this pulse signal. The voltage outputted from the wave detector 35a may be inputted to the peak hold circuit part 35b. As illustrated in FIG. 4, the peak hold circuit part 35b may hold a peak value of the voltage (peak voltage) inputted from the wave detector 35a. The controlling module 36 may read the peak voltage held by the peak hold circuit part 35b. Thus, in this embodiment, the transmission power of the pulse signal may be detected by being converted into a voltage corresponding to the transmission power. Note that, a different method may also be used as long as the transmission power of the pulse signal is detectable.

The controlling module 36 may calculate the transmission power of the pulse signal based on the peak voltage held by the peak hold circuit part 35b. The controlling module 36 may calculate a control value for reducing a difference between the calculated transmission power and a target transmission power and output it to the variable attenuator 32. Note that details of processing performed by the controlling module 36 will be described later.

The radar control device 12 may include the receiver 41, a reception signal processing module 42, and an image generating module 43, as components regarding reception and analysis of the reception signal.

The receiver 41 may receive the reception signal inputted from the radar antenna 11 via the transmission-reception switch 34. The receiver 41 may also amplify the power of this reception signal. The receiver 41 may output the reception signal with the amplified power, to the reception signal processing module 42.

The reception signal processing module 42 may perform quadrature detection, pulse compression, etc. on the reception signal. Thus, even when a pulse signal with low transmission power is transmitted, data at a high S/N ratio may be obtained.

The image generating module 43 may generate a radar image based on the reception signal. For example, the image generating module 43 may acquire a distance from the radar antenna 11 to the target object based on a time difference between a timing at which the radar antenna 11 transmits the pulse signal and a timing at which the reflection of the pulse signal is received. Further, the image generating module 43 may obtain a direction in which the target object is located based on the orientation of the radar antenna 11 when transmitted the pulse signal. Thus, the image generating module 43 may generate the radar image graphically showing the position of the target object located around the ship.

Here, parts constituting the radar control device 12 (e.g., the signal generating module 31, the controlling module 36, the reception signal processing module 42 and the image generating module 43) may be achieved by an arithmetic processor such as an FPGA, an ASIC, or a CPU. For example, the signal generating module 31 etc. may include a memory, such as a ROM, storing program(s) etc., and the function of the signal generating module 31 etc. may be achieved by the arithmetic processor reading and executing the program(s) stored in the memory. Note that the memory, such as the ROM, may store information other than the program(s). Moreover, the signal generating module 31 etc. may individually be configured by separate hardware or configured by the same hardware.

The display device 13 may display electronic data. The display device 13 may be a liquid crystal display, but it may alternatively be a different type of display (e.g., organic EL display).

Figure 5:
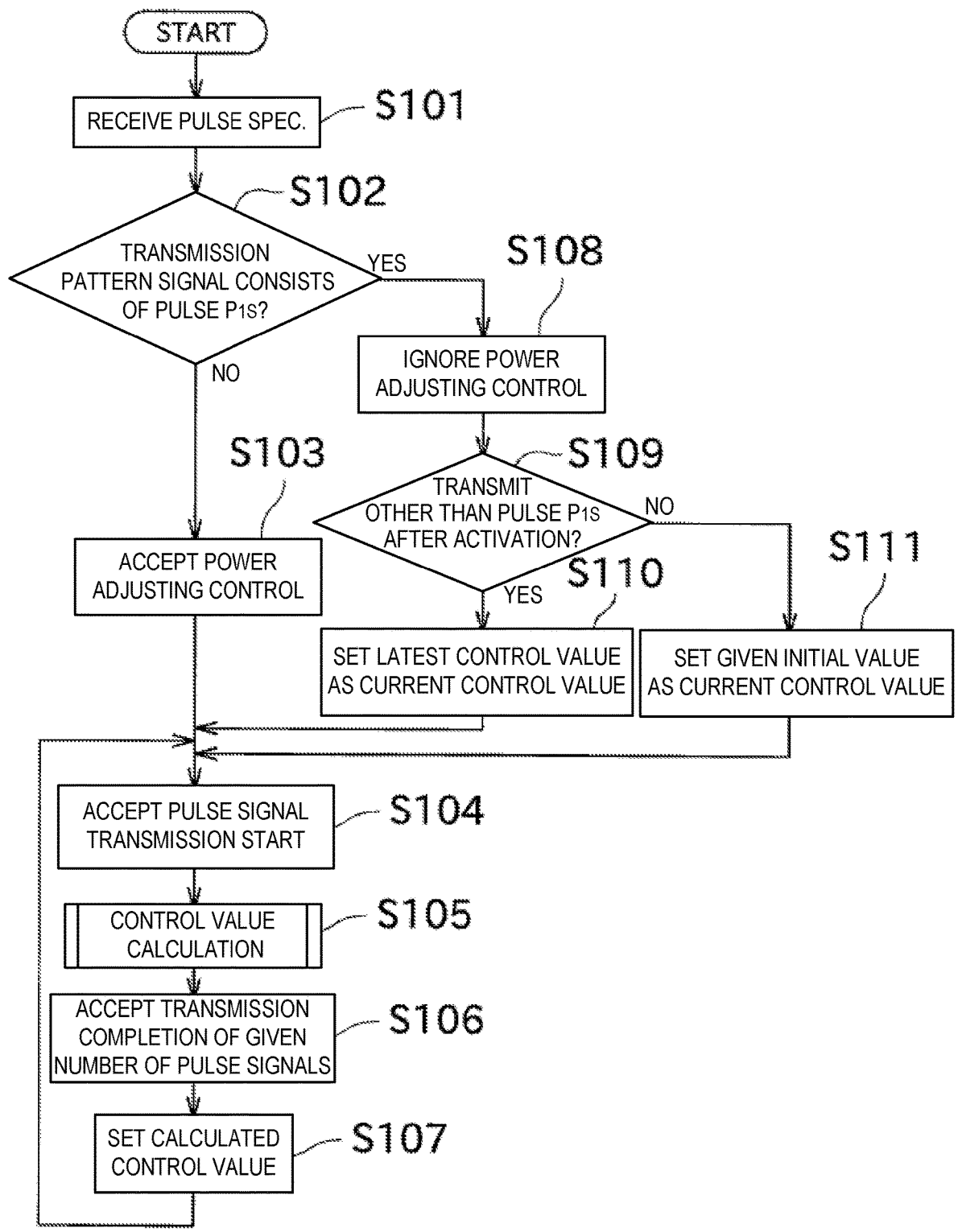
FIG. 5 is a flowchart illustrating a control executed by the controlling module to adjust transmission power.
Figure 6:
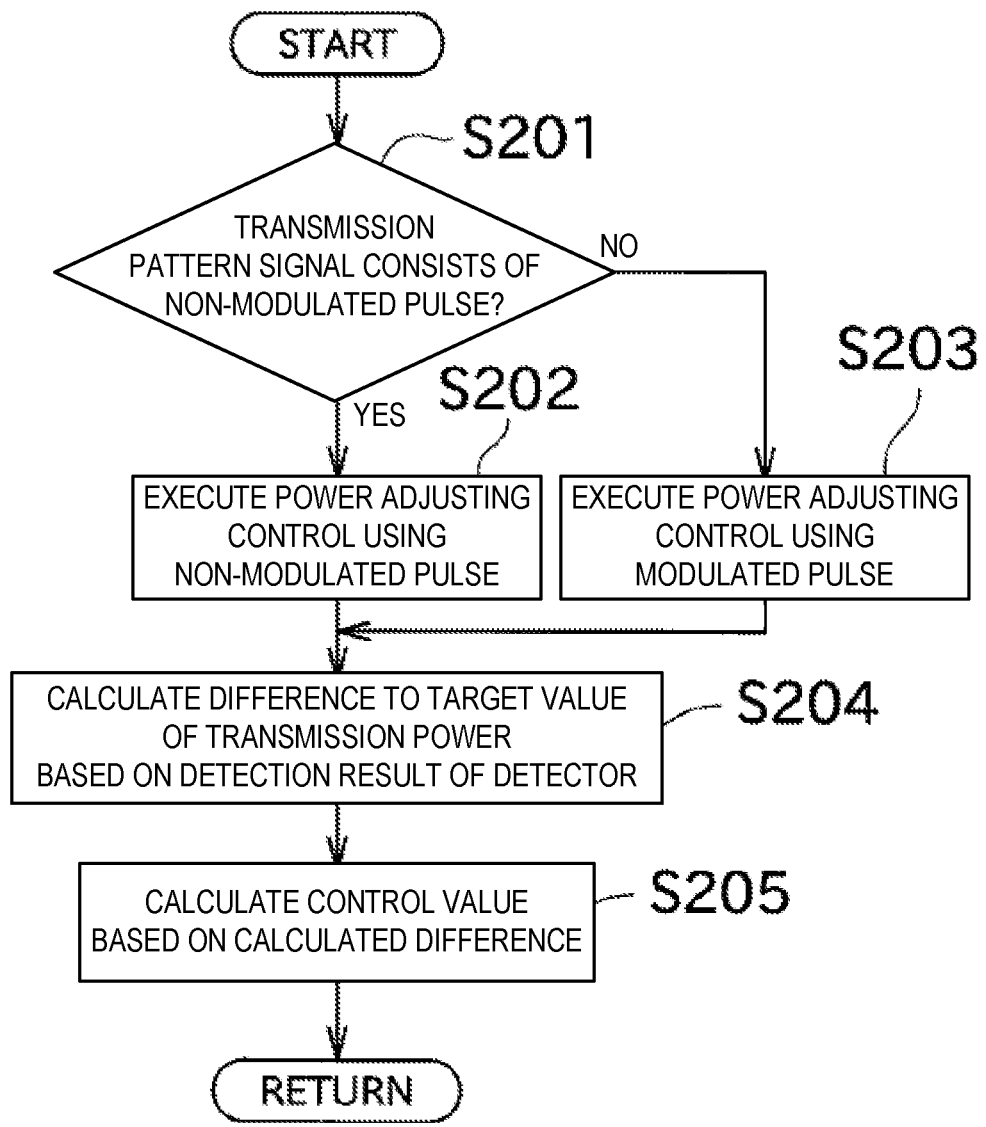
FIG. 6 is a flowchart illustrating a control value calculation.

Next, the control for adjusting the transmission power of the pulse signal constituting the transmission pattern signal will be described in detail with reference to FIGS. 4 to 6. FIG. 5 is a flowchart illustrating the control performed by the controlling module 36 to adjust the transmission power. FIG. 6 is a flowchart illustrating a control value calculation.

First, a case where the detector 35 cannot detect the transmission power of the pulse signal is described. As described above, the wave detector 35a may output the voltage corresponding to the transmission power of the pulse signal and the peak hold circuit part 35b may hold the peak voltage thereof. Here, the peak hold circuit part 35b may not be able to instantly measure the voltage outputted by the detector 35 but depend on a response speed etc. of an operational amplifier provided to the peak hold circuit part 35b. Therefore, as illustrated in FIG. 4, when detecting the transmission power of the pulse $P_{1S}$ with the short pulse width, the voltage outputted from the wave detector 35a may drop before reaching the value corresponding to the transmission power, the transmission power cannot accurately be detected. Therefore, a suitable feedback control cannot be executed.

The pulse width with which the transmission power is accurately detectable may vary depending on the performance etc. of the detector 35, and for example, the accurate detection of the transmission power may become difficult when the pulse width is 100 nanoseconds or shorter.

In this embodiment, only the transmission power of the pulse $P_{1S}$ having the shortest pulse width cannot accurately be detected. Therefore, the pulse $P_{1S}$ is referred to as a first pulse signal and the other pulse signals are referred to as a second pulse signal. In this embodiment, when the transmission pattern signal consists of the pulse $P_{1S}$, processing using a control value calculated in previously-performed processing may be performed instead of the feedback control. Hereinafter, this processing is described in detail with reference to the flowcharts of FIGS. 5 and 6.

The processing illustrated in FIG. 5 may be performed when a standby state of the radar apparatus 10 is canceled or the radar apparatus 10 is activated. First the controlling module 36 may receive the specification of the pulse signals included in the transmission pattern signal from the signal generating module 31 (S101). The specification of the pulse signals includes the kinds of pulse signals (modulated or non-modulated, pulse width) and the transmission pattern.

Next the controlling module 36 may determine whether the transmission pattern signal consists of the pulse $P_{1S}$, based on the specification received by the signal generating module 31 (S102). The case where the transmission pattern signal consists of the pulse $P_{1S}$ may correspond to pattern A of FIG. 3. The case where the transmission pattern signal does not only consist of the pulse $P_{1S}$ may be a case of transmitting the pulse $P_{1S}$ and a different pulse signal or a case of transmitting the different pulse signal but not the pulse $P_{1S}$.

If the controlling module 36 determines that the transmission pattern signal does not only consist of the pulse $P_{1S}$ (NO at S102), it may accept a power adjusting control (S103). The power adjusting control may be the feedback control, which is briefly described above, for detecting the transmission power and changing, according to a detection result thereof, the control value outputted to the variable attenuator 32.

Next the controlling module 36 may receive information indicating to start the transmission of the pulse signal from the signal generating module 31 (S104). Further, the pulse signals constituting the transmission pattern signal may sequentially be outputted from the signal generating module 31. Next the controlling module 36 may execute the control value calculation for the pulse signals to be outputted (S105).

The control value calculation may be processing illustrated in FIG. 6 and for detecting the transmission power and calculating, according to a detection result thereof, the control value to be outputted to the variable attenuator 32. Below, this is descried in detail.

First, the controlling module 36 may determine whether the transmission pattern signal consists of the non-modulated pulse signals (S201). This determination may be performed, for example, based on ON/OFF of the pulse transmission period illustrated in FIG. 4. The pulse transmission period is turned ON for the period for transmitting the pulse signals, and the pulse transmission period is turned OFF for the period for receiving the pulse signals. As described above, since the non-modulated pulse signals and the modulated pulse signals have a large difference in their pulse widths, it is possible to determine whether the pulse signals to be transmitted are the non-modulated pulse signals or the modulated pulse signals based on the length of the pulse transmission period.

If the transmission pattern signal consists of the non-modulated pulse signals, the controlling module 36 may execute the power adjusting control by using the non-modulated pulse signals (S202). If the transmission pattern signal does not only consist of the non-modulated pulse signals (i.e., the modulated pulse signal is included), the controlling module 36 may execute the power adjusting control by using the modulated pulse signals (S203). Note that, when the transmission pattern signal includes both the non-modulated and modulated pulse signals, although the power adjusting control may be executed using either of the signals, since the modulated pulse signal has a wider pulse width and it is easier to accurately detect the transmission power by using it, the power adjusting control may be executed using the modulated pulse signal.

Next, the controlling module 36 may calculate the difference to the target value of the transmission power based on the detection result of the detector 35 (the voltage read from the peak hold circuit part 35b) (S204). For example, since the voltage read from the peak hold circuit part 35b is a value corresponding to the transmission power of the pulse signal constituting the transmission pattern signal, the transmission power of the pulse signal may be calculated based on this voltage. Then, the controlling module 36 may calculate the difference between the calculated transmission power and the target value (target transmission power). Note that, although in this embodiment the difference between the detection value (calculated value) and the target value is calculated in terms of transmission power, the calculated difference between the detection value (calculated value) and the target value may alternatively be in terms of the voltage. In this case, the voltage corresponding to the target transmission power needs to be calculated.

Next, the controlling module 36 may calculate the control value based on the calculated difference (S205). For example, the control value may be calculated so that the calculated difference becomes small (becomes zero). Although the method of calculating the control value is arbitrary, the control value may be calculated based only on this difference or, in order to prevent overshooting, a control value for current processing may be calculated based on a change gradient of a latest transmission power (or difference).

Thus, the control value calculation may be completed. Note that, in this embodiment, the control value may be calculated based on a given number of pulse signals. Specifically, a value obtained by, for example, taking an average of the transmission powers of the given pulse signals may be compared to a target value and the control value may be calculated based on this comparison result.

Then, the controlling module 36 may receive information indicating the completion of the transmission of the given number of pulse signals from the signal generating module 31 (S106). After S106 (i.e., at a timing outside the pulse transmission period), the controlling module 36 may set the control value calculated in the control value calculation, into the variable attenuator 32 (S107). Further, the controlling module 36 may store the set control value in the ROM provided therein or an external memory. Then, the controlling module 36 may repeat the processings of S104 to S107 until the pulse signal is switched. As a result, it is possible to transmit the pulse signal while maintaining the state where the transmission power of the pulse signal is brought closer to the target value.

Note that this power adjusting control (feedback control) cannot be performed when the transmission pattern signal consists of the pulse $P_{1S}$. Therefore, when the transmission pattern signal is determined to consist of the pulse $P_{1S}$ (YES at S102, i.e., when the transmission pattern is pattern A), the controlling module 36 may ignore the power adjusting control (S108). Thus, the controlling module 36 may not execute the control of the control value based on the difference between the detection value and the target value (S105, S107, etc.).

In this case, the controlling module 36 may determine whether a pulse signal other than the pulse $P_{1S}$ has been transmitted after the activation of the radar apparatus 10 (S109). This determination may be performed, for example, based on whether the control value is stored at S107. If the pulse signal other than the pulse $P_{1S}$ has been transmitted after the activation of the radar apparatus 10 (YES at S109), the controlling module 36 may transmit the pulse $P_{1S}$ using the control value (particularly, the latest control value) used for transmitting the pulse signal other than the pulse $P_{1S}$ (S110). The characteristics of various parts (particularly, the variable attenuator 32) of the radar control device 12 may change due to aging, depending on an ambient temperature, etc. Therefore, by using the latest control value, the transmission power may be brought even closer to the target value.

On the other hand, if only the pulse $P_{1S}$ has been transmitted after the activation of the radar apparatus 10 (NO at S109), the controlling module 36 may transmit the pulse $P_{1S}$ using a given initial value for the control value (S111). As described above, since the control value does not change when only transmitting the pulse $P_{1S}$, this control may be referred to as the fixed value control. Since the transmission power cannot accurately be detected during the transmission of the pulse $P_{1S}$, the controlling module 36 may not read the voltage outputted from the peak hold circuit part 35b. That being said, this voltage may still be read even though the voltage outputted by the peak hold circuit part 35b is unnecessary.

Then, the controlling module 36 may start the transmission of the pulse signals (S104). Note that since the processings at S105 and S107 are the power adjusting control, the controlling module 36 may not perform these processings (ignore the power adjusting control). Therefore, the controlling module 36 may continue using the control value set at S110 or S111 until the pulse signals to be transmitted are changed.

As described above, the radar control device 12 of this embodiment may include the signal generating module 31, the transmitter 33, the detector 35 and the controlling module 36, and implement the following radar transmission power controlling method. The signal generating module 31 may generate the transmission pattern signal comprised of one or more kinds of pulse signals set among the pulse signals including the first pulse signal (pulse $P_{1S}$) and the second pulse signal having a longer pulse width than the first pulse signal (the pulse signal other than the pulse $P_{1S}$) (signal generation process). The transmitter 33 may externally transmit the transmission pattern signal generated by the signal generating module 31 via the radar antenna 11 (transmission process). The detector 35 may detect the transmission power of the pulse signal included in the transmission pattern signal transmitted by the transmitter 33 (detection process). When the transmission pattern signal generated by the signal generating module 31 includes the second pulse signal, the controlling module 36 may control the transmission power by using the control value calculated based on the transmission power of the second pulse signal detected by the detector 35. Further, when the transmission pattern signal generated by the signal generating module 31 consists of the first pulse signal, the controlling module 36 may control the transmission power of the first pulse signal by using the control value which is previously used for controlling the transmission power of the second pulse signal.

Thus, even when the detector 35 cannot accurately detect the transmission power of the first pulse signal, by using the control value used for the control of the second pulse signal, the transmission power of the first pulse signal may be brought closer to the target value.

Further, in the radar control device 12 of this embodiment, when the transmission pattern signal generated by the signal generating module 31 includes the first and second pulse signals, the controlling module 36 may control the transmission powers of the first and second pulse signals by using the control value calculated based on the transmission power of the second pulse signal detected by the detector 35.

Thus, when transmitting both the first and second pulse signals, by using the control value calculated based on the latest detection result of the transmission power of the second pulse signal instead of the previous detection result, the transmission power of the first pulse signal may accurately be controlled.

Further, in the radar control device 12 of this embodiment, the controlling module 36 may control the transmission power of the first pulse signal by using the latest control value among the control values used for controlling the transmission power of the second pulse signal in the past.

Since an optimal value for the control value varies depending on the ambient temperature, due to aging etc., by using the latest control value, the transmission power of the first pulse signal may be brought even closer to the target value.

Further, in the radar control device 12 of this embodiment, after the transmission pattern signal is switched, the controlling module 36 may determine whether the transmission pattern signal consists of the first pulse signal. When the transmission pattern signal is determined to only consist of the first pulse signal, the controlling module 36 may continue controlling the transmission power of the first pulse signal by using the control value which is previously used for controlling the transmission power of the second pulse signal, until the transmission pattern signal is changed again.

Thus, the transmission power of the first pulse signal may be brought closer to the target value with simple processing.

Moreover, in the radar control device 12 of this embodiment, the signal generating module 31 may generate the transmission pattern signal comprised of one or more pulse signals set among the three or more kinds of pulse signals having the different pulse widths. When the transmission pattern signal consists of the pulse signal having a shorter pulse width than the given pulse width determined based on the ability of the detector 35 to detect the transmission power among the pulse signals generated by the signal generating module 31, the controlling module 36 may control the transmission power by using the control value which is previously used for controlling transmission power of the second pulse signal.

Thus, the previous control value may be used only for the control of the transmission power of the pulse signal of which transmission power cannot be accurately detected.

Although the suitable embodiment of the present disclosure is described above, the above configuration may be modified as follows, for example.

Although in the above embodiment, the non-modulated pulse signals have three kinds of the pulse widths and the modulated pulse signals have three kinds of the pulse widths, the number of kinds of each pulse width may alternatively be two or less, or four or more. Moreover, it may alternatively be configured such that only the non-modulated pulse signal or the modulated pulse signal is transmitted. Furthermore, although in the above embodiment, only one kind of pulse signal of which transmission power cannot be accurately detected is used, two or more kinds of such pulse signals may be used.

The radar apparatus 10 of the above embodiment cannot change the transmission pattern signal unless it is in the standby state. Alternatively, the radar apparatus 10 may change the transmission pulse signal without going through the standby state.

The flowcharts of FIGS. 5 and 6 of the above embodiment are merely an example, and processing may be added, changed or deleted, etc. In these flowcharts, the control value may be calculated using the average etc. of the transmission power of a given number of pulse signals; however, for example, the control value may be calculated using the transmission power of one pulse signal.

Further, in these flowcharts, the control value set after the current activation of the radar apparatus 10 may be set again at S109 and S110, and the control value set in the previous activation may be ignored. In this regard, when no control value is set at the current activation while a control value is set in the previous activation, the control value set in the previous activation may be adopted.

In the above embodiment, although the example in which the present disclosure is applied to the radar apparatus for the ship is described, the present disclosure may also be applied to a radar apparatus mounted on a movable body (e.g., aircraft) other than the ship. Moreover, the present disclosure may be applied to a radar apparatus installed in a building etc. instead of the movable body.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A radar control device, comprising:
   processing circuitry configured to generate a transmission pattern signal comprising at least one of a first pulse signal and a second pulse signal, the second pulse signal having a longer pulse width than the first pulse signal; and a transmitter configured to transmit the generated transmission pattern signal via a radar antenna; wherein the processing circuitry is further configured to:

detect for a transmission power of the second pulse signal in the transmission pattern signal transmitted by the transmitter, control, when the transmission power of the second pulse signal is detected, a transmission power of the transmission pattern signal by using a control value calculated based on the transmission power of the second pulse signal, and control, when the transmission pattern signal consists of the first pulse signal, the transmission power of the first pulse signal by using a control value previously used for controlling the transmission power of the second pulse signal.

2. The radar control device of claim 1, wherein the processing circuitry is further configured to control, when the transmission pattern signal includes the first pulse signal and the second pulse signal, the transmission powers of the first and second pulse signals by using the control value calculated based on the transmission power of the second pulse signal.

3. The radar control device of claim 2, wherein the processing circuitry is further configured to control, when the transmission pattern signal consists of the first pulse signal, the transmission power of the first pulse signal by using a latest control value among control values used for controlling the transmission power of the second pulse signal in the past.

4. The radar control device of claim 3, wherein, when the transmission pattern signal is changed, the processing circuitry is further configured to:

determine whether the changed transmission pattern signal consists of the first pulse signal, and control, when the transmission pattern signal is determined to consist of the first pulse signal, the transmission power of the first pulse signal by using a control value used for controlling the transmission power of the second pulse signal in the past, until the transmission pattern signal is changed again.

5. The radar control device of claim 4, wherein the processing circuitry is further configured to:

generate a transmission pattern signal comprising at least one of three or more kinds of pulse signals having different pulse widths, and control, when the transmission pattern signal consists of a pulse signal having a shorter pulse width than a given pulse width that is determined based on an ability to detect the transmission power, the transmission power of the transmission pattern signal by using the control value previously used for controlling the transmission power of the second pulse signal.

6. The radar control device of claim 5, wherein the transmission pattern signal is comprised of at least one of a modulated pulse signal and a non-modulated pulse signal, and the first pulse signal is the non-modulated pulse signal having a shortest pulse width among the pulse signals constituting the transmission pattern signal.

7. The radar control device of claim 6, wherein the pulse width of the first pulse signal is 100 nanoseconds or shorter.

8. The radar control device of claim 1, wherein the processing circuitry is further configured to control, when the transmission pattern signal consists of the first pulse signal, the transmission power of the first pulse signal by using a latest control value among control values used for controlling the transmission power of the second pulse signal in the past.

9. The radar control device of claim 1, wherein, when the transmission pattern signal is changed, the processing circuitry is further configured to:

determine whether the changed transmission pattern signal consists of the first pulse signal, and control, when the transmission pattern signal is determined to consist of the first pulse signal, the transmission power of the first pulse signal by using a control value used for controlling the transmission power of the second pulse signal in the past, until the transmission pattern signal is changed again.

10. The radar control device of claim 1, wherein the processing circuitry is further configured to:

generate a transmission pattern signal comprising at least one of three or more kinds of pulse signals having different pulse widths, and control, when the transmission pattern signal consists of a pulse signal having a shorter pulse width than a given pulse width that is determined based on an ability to detect the transmission power, the transmission power of the transmission pattern signal by using the control value previously used for controlling the transmission power of the second pulse signal.

11. The radar control device of claim 1, wherein the transmission pattern signal is comprised of at least one of a modulated pulse signal and a non-modulated pulse signal, and the first pulse signal is the non-modulated pulse signal having a shortest pulse width among the pulse signals constituting the transmission pattern signal.

12. The radar control device of claim 1, wherein the pulse width of the first pulse signal is 100 nanoseconds or shorter.

13. A method of controlling a transmission power of a radar, comprising:

generating a transmission pattern signal comprising at least one of a first pulse signal and a second pulse signal, the second pulse signal having a longer pulse width than the first pulse signal;

transmitting the generated transmission pattern signal via a radar antenna;

detecting for a transmission power of the second pulse signal in the transmission pattern signal transmitted by a transmitter;

controlling, when the transmission power of the second pulse signal is detected, a transmission power of the transmission pattern signal by using a control value calculated based on the transmission power of the second pulse signal; and controlling, when the transmission pattern signal consists of the first pulse signal, the transmission power of the first pulse signal by using a control value previously used for controlling the transmission power of the second pulse signal.

* * * * *